United States Patent
Meyer et al.

(10) Patent No.: US 6,688,244 B1
(45) Date of Patent: Feb. 10, 2004

(54) PRODUCT ON DEMAND DELIVERY SYSTEM

(75) Inventors: Bradley John Meyer, Davenport, IA (US); Nathan Albert Mariman, Geneseo, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/214,957

(22) Filed: Aug. 8, 2002

(51) Int. Cl.⁷ .............................. A01C 1/00; A01C 7/00
(52) U.S. Cl. ....................................... 111/174; 111/177
(58) Field of Search ................................ 111/174, 170, 111/177, 77, 925; 221/211

(56) References Cited

U.S. PATENT DOCUMENTS

| | | | |
|---|---|---|---|
| 5,156,102 A | 10/1992 | Andersen | 111/175 |
| 5,161,473 A | 11/1992 | Landphair et al. | 111/176 |
| 5,392,722 A | 2/1995 | Snipes et al. | 111/174 |
| 5,740,746 A | 4/1998 | Ledermann et al. | 111/174 |
| 5,915,313 A | 6/1999 | Bender et al. | 111/178 |
| 6,047,652 A | 4/2000 | Prairie et al. | 111/174 |
| 6,298,797 B1 | 10/2001 | Mayerle et al. | 111/175 |

OTHER PUBLICATIONS

Farm Forum Advertisement, "Productive Equipment Systems", p. 25, Spring 2002.

*Primary Examiner*—Christopher J. Novosad

(57) ABSTRACT

A product on demand delivery system directs product from a main hopper to an application unit. An air pump directs pressurized air to a plurality of air supply hoses. The air supply hoses are coupled to air inlets located on the nozzle assembly of the main hopper. Opposite the air inlets are corresponding product outlets for receiving the air streams and product entrained in the air stream. The product outlets are coupled to product supply hoses that are in turn coupled to auxiliary hoppers located on the application units. The air inlet is downwardly angled relative to the bottom and the product outlet is upwardly angled relative to the bottom. Peaked baffles are located above corresponding air inlet and outlets so that product puddles form beneath the baffles. Gaps are formed between adjacent baffles so that product from the main hopper can flow into the product puddles.

33 Claims, 7 Drawing Sheets

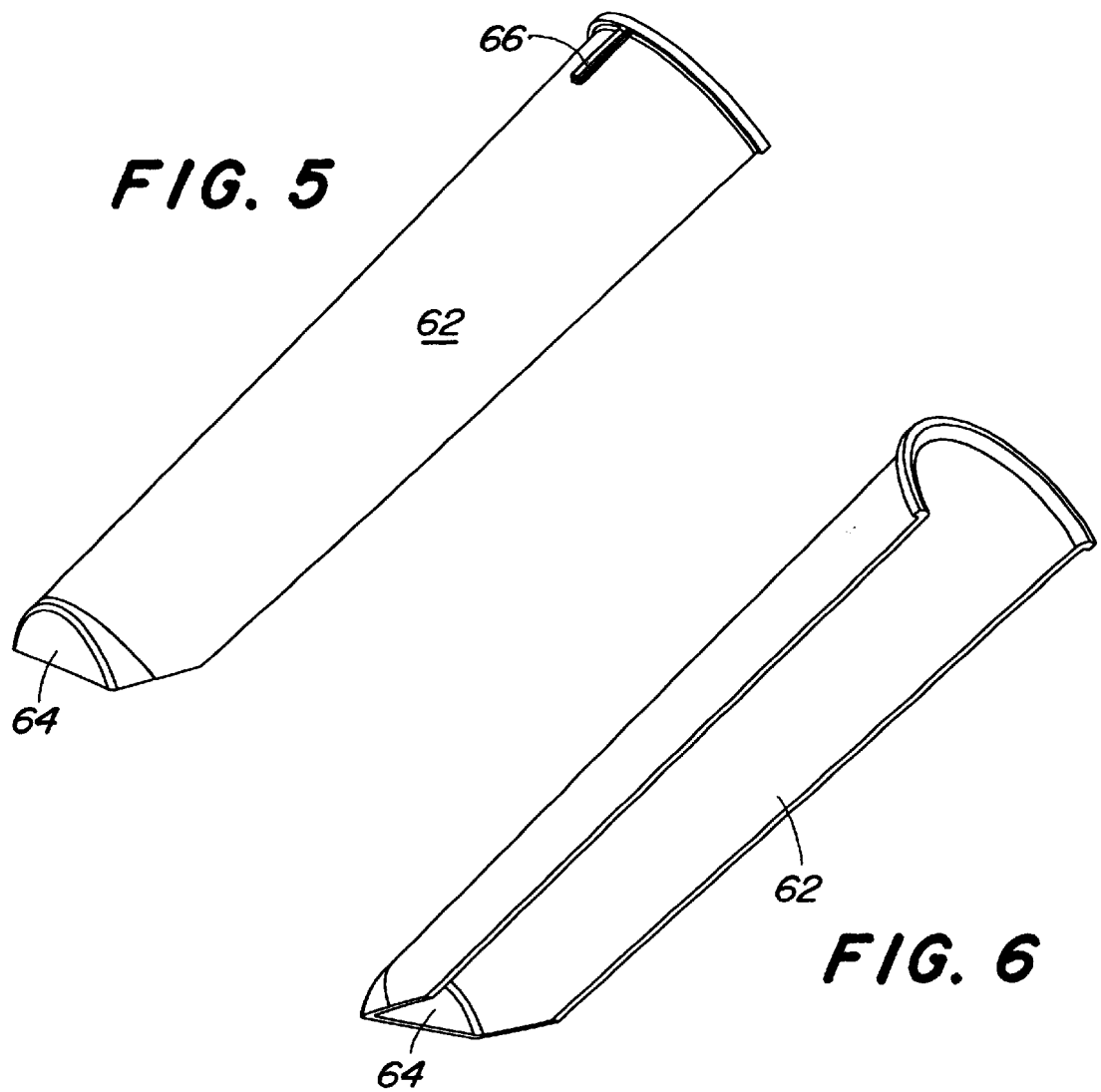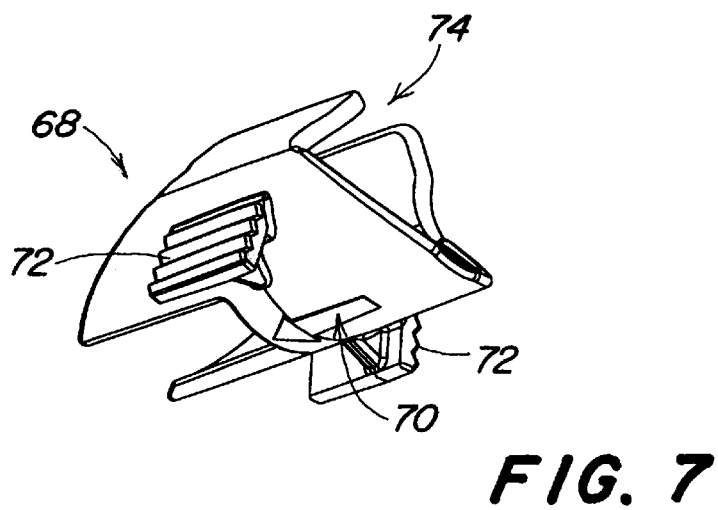

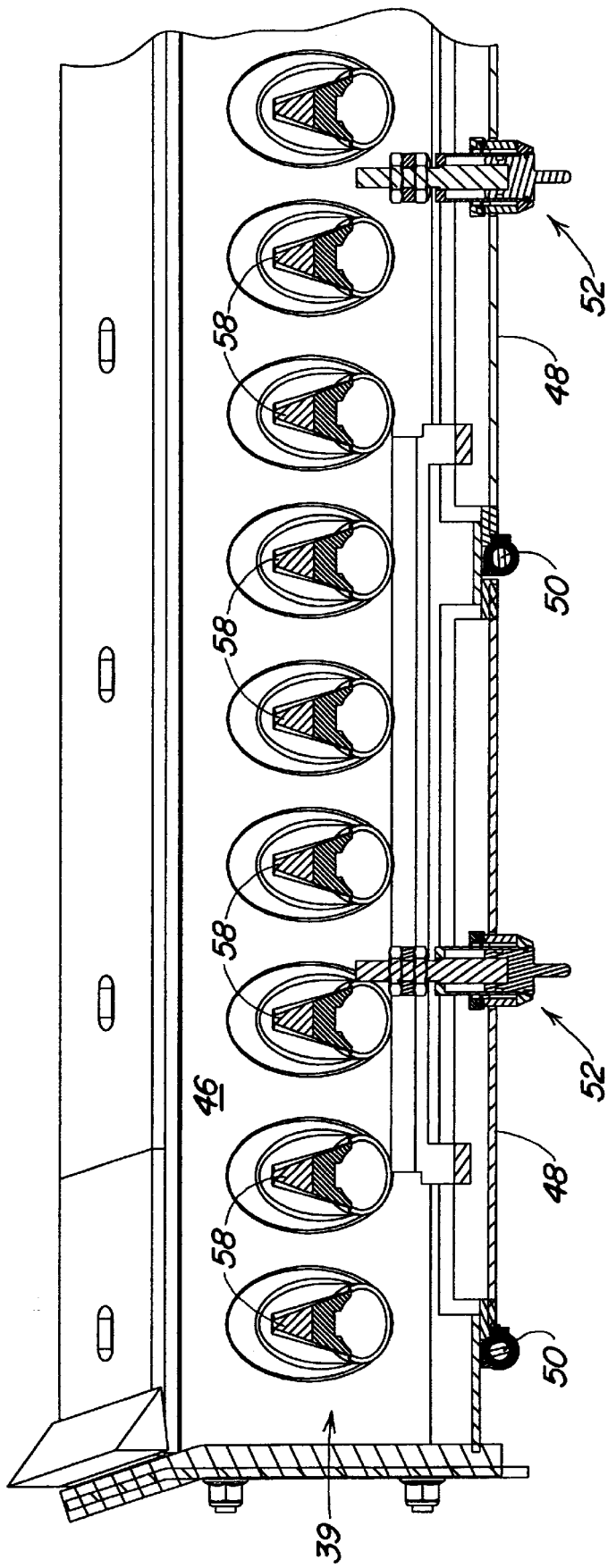

PRODUCT ON DEMAND DELIVERY SYSTEM

FIELD OF THE INVENTION

Figure 1:
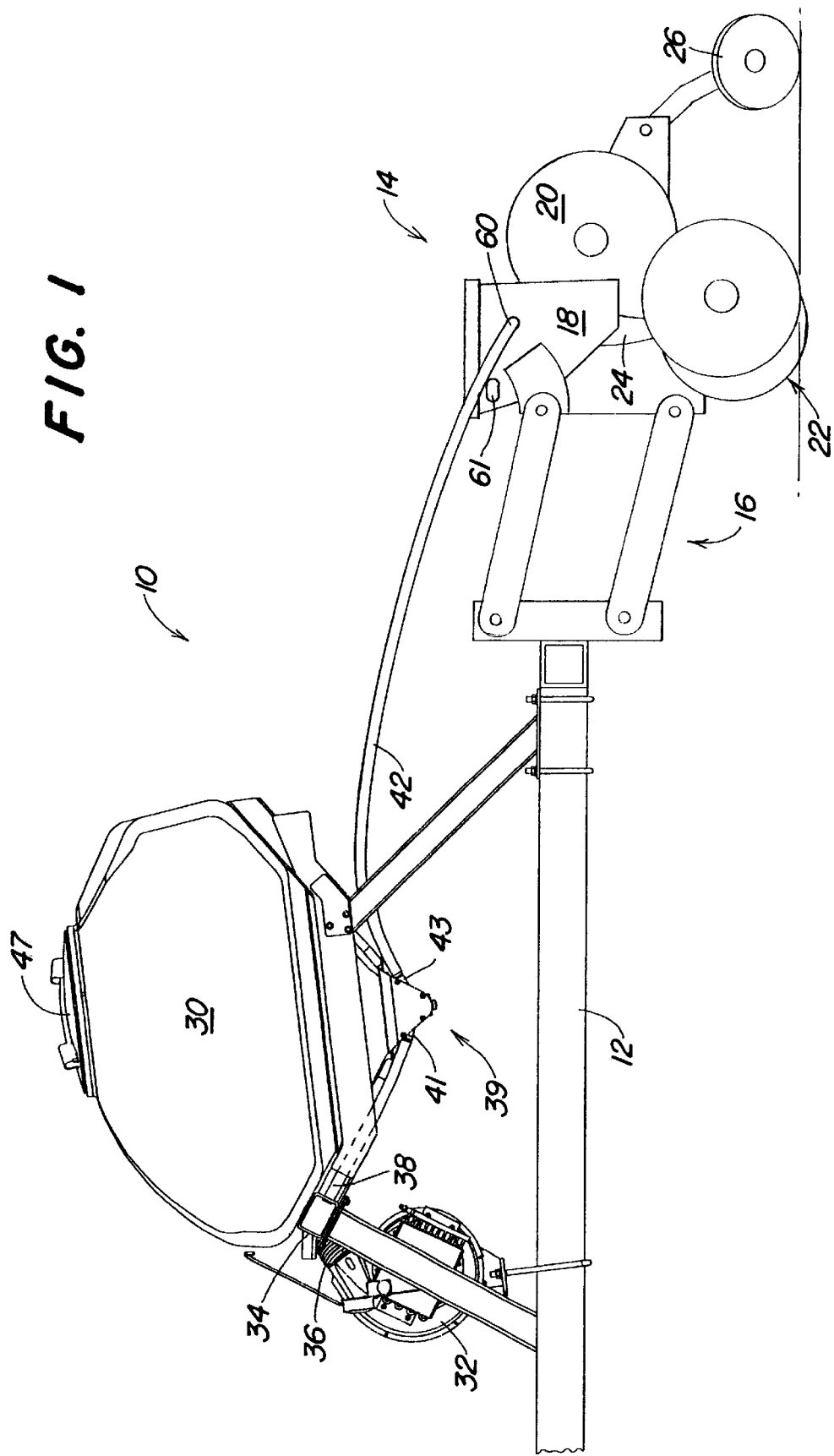
Figure 2:
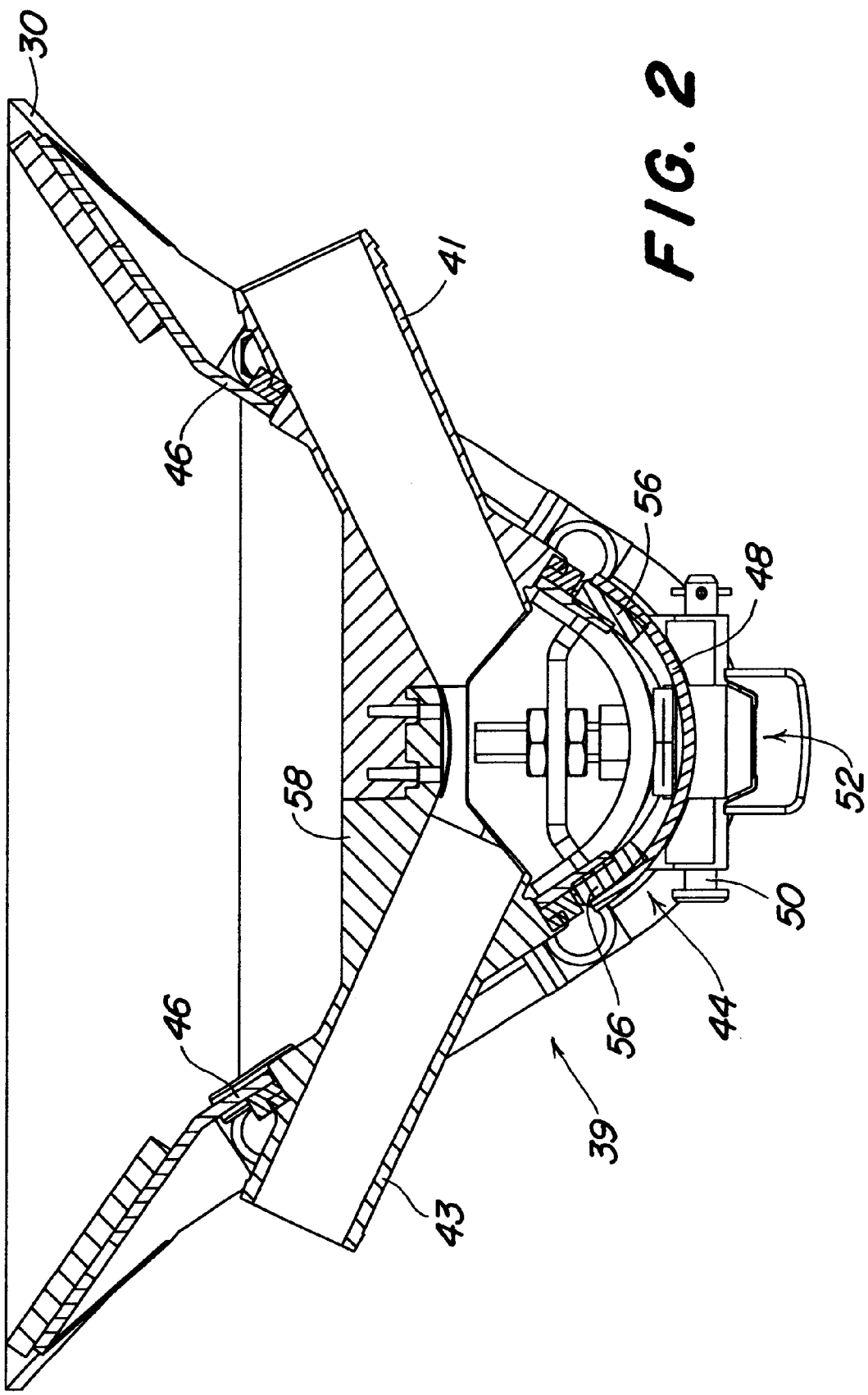
Figure 3:
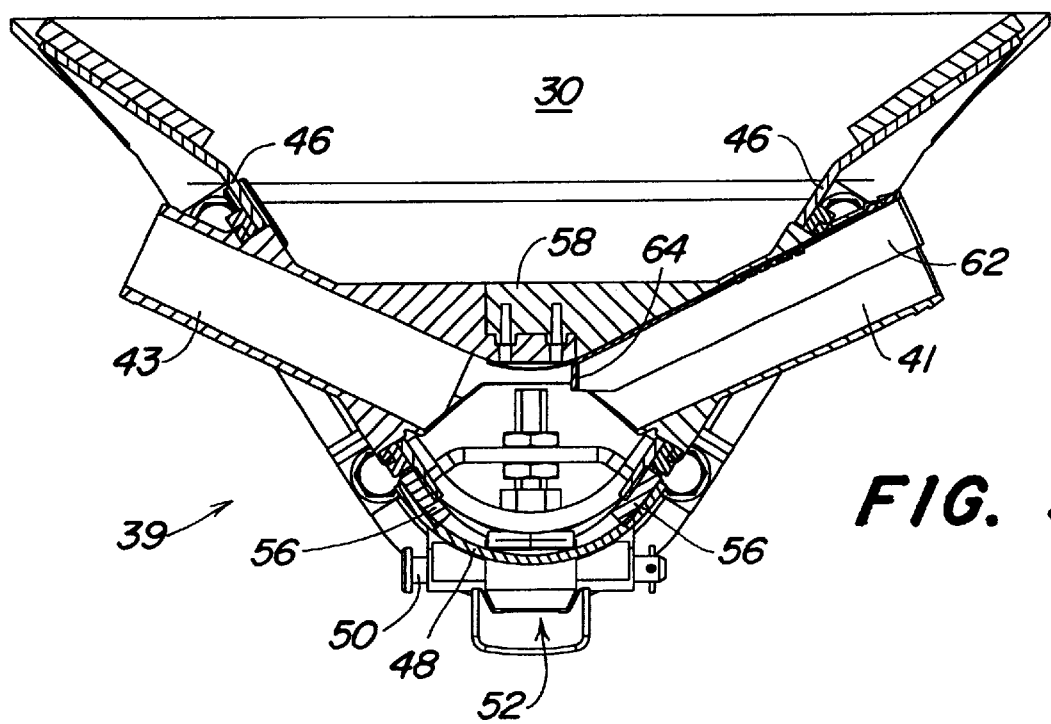
Figure 4:
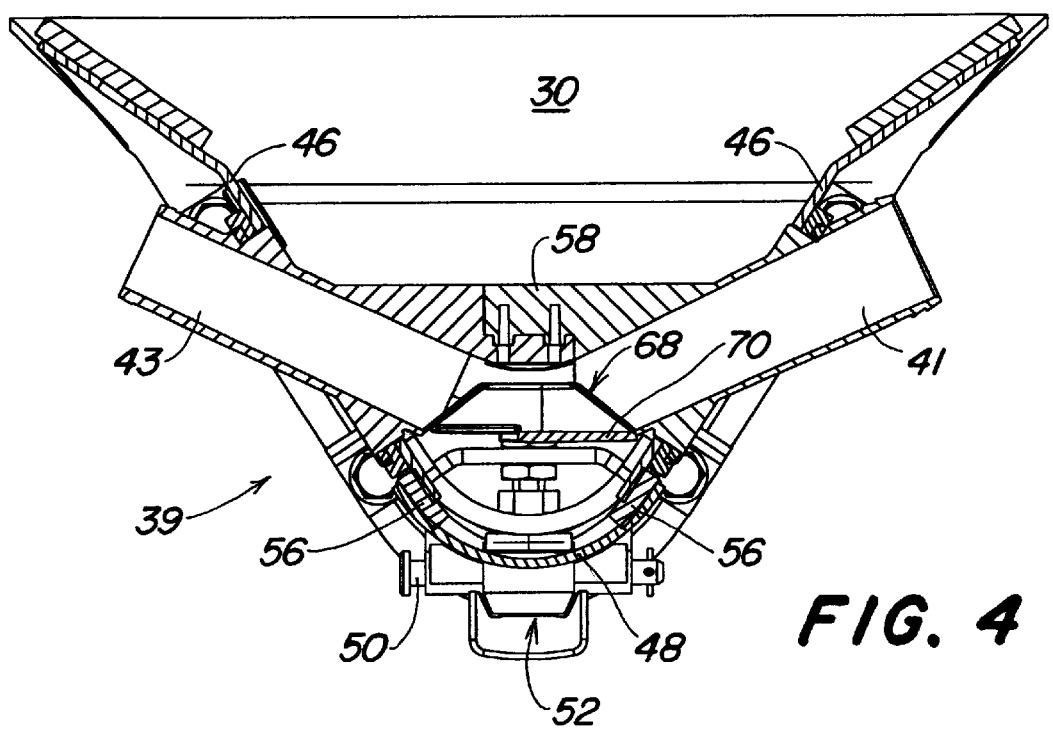
Figure 9:
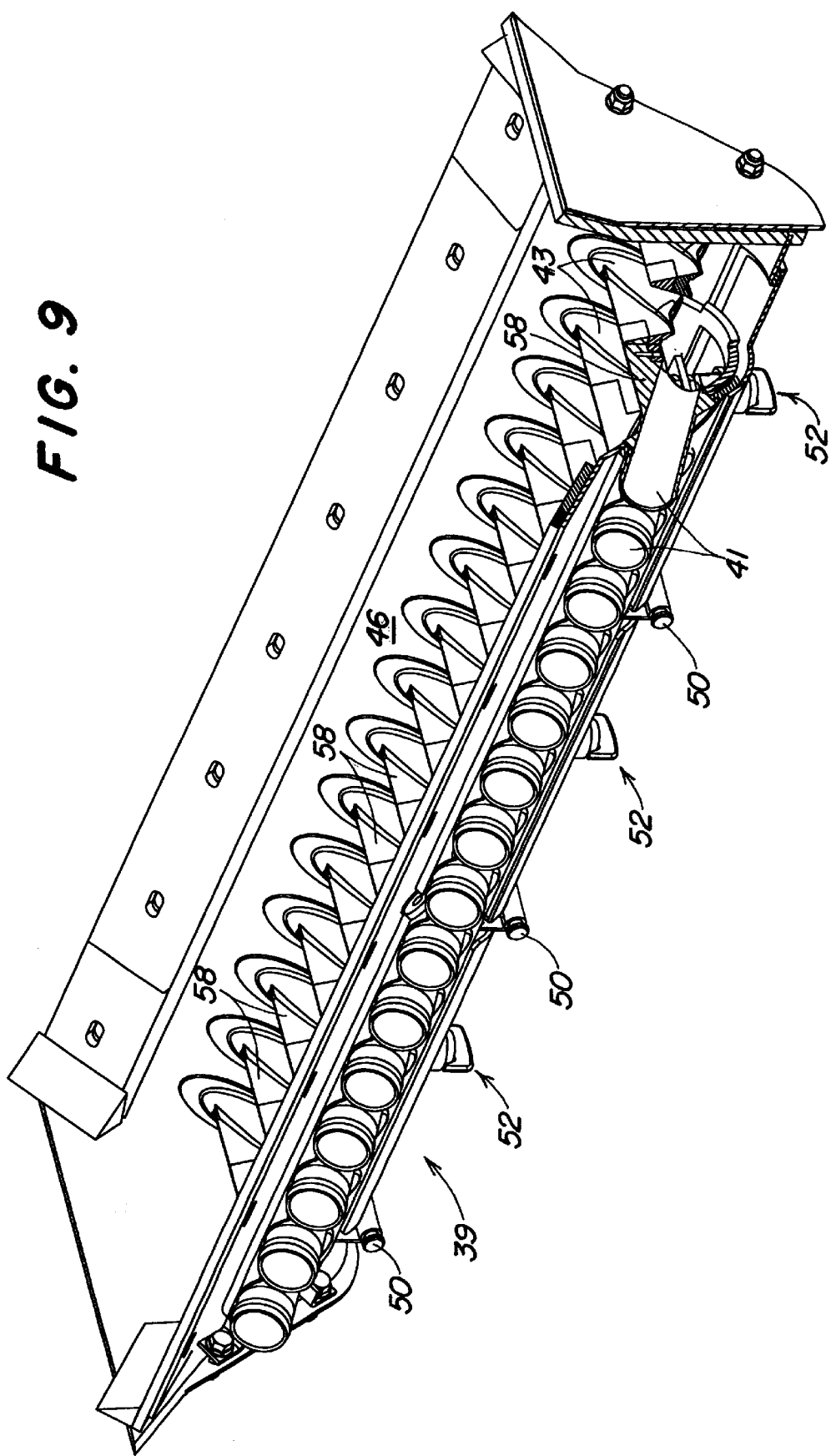

The present invention is directed to a product on demand delivery system wherein bulk product is taken up by an air stream from a main hopper and is directed to an application unit having an auxiliary hopper. The bulk product is applied to a field by the application unit.

BACKGROUND OF THE INVENTION

Pneumatic product on demand delivery systems have been used on agricultural seeding machines to automatically direct seed from a main seed hopper to a plurality of individual planting units. Each of the individual planting units has an auxiliary seed hopper for receiving the seed, a seed meter for metering the seed from the auxiliary seed hopper and a furrow opener for forming a planting furrow into which the metered seed is deposited. A fan is used to create pressurized air that forms an air stream on which the seed is taken to the planting units. These systems automatically replenish the auxiliary hoppers as needed.

Air seeders meter seed upstream of the transporting air stream. As the meter is more remote from the application device the product is not metered onto the field in as accurate a manner as an application unit where the product meters are in close proximity to the application site.

The commercially available seed on demand delivery systems typically require a large fan to create the air stream. The large fan is required because of the pressure losses in the pneumatic system caused by abrupt changes in direction by the air stream in the main hopper.

SUMMARY OF THE INVENTION

It is an object of the present invention to provide a product on demand delivery system wherein the air stream passing through the main hopper is not subjected to the abrupt changes in direction.

A product on demand delivery system comprises a frame having a main hopper and an application unit. An air pump directs pressurized air to a manifold where the pressurized air is distributed to a plurality of air supply hoses. The air supply hoses are coupled to air inlets located on the bottom of the main hopper. Opposite the air inlets are corresponding product outlets for receiving the air streams and product entrained in the air stream. The product outlets are coupled to product supply hoses that are in turn coupled to auxiliary hoppers located on the application units. The bottom of the main hopper is concave and has outwardly diverging side walls. The air inlet is downwardly angled relative to the bottom and the product outlet is upwardly angled relative to the bottom. Peaked baffles are located above corresponding air inlets and outlets so that product puddles form beneath the baffles. Gaps are formed between adjacent baffles so that product from the main hopper can flow into the product puddles.

With product having large particles, like corn and soybeans, an insert may be placed in the air inlet. The insert is provided with an air deflecting portion that directs a portion of the air stream downwardly into the product puddle formed under the baffles to stir up some of the product so that it is more readily entrained in the air stream passing into the product outlet.

Product having small particles can be picked up too readily by the air stream passing from the air inlet to the product outlet. As such, a clip on element is provided which clips onto the baffles and limits the exposure of the air stream to the product puddle by covering a portion of the product puddle.

The product on demand delivery system can be used to supply seed from a main seed hopper to an auxiliary seed hopper located on a planting unit. The planting unit would include an auxiliary seed hopper that supplies seed to a seed meter which in turn directs metered seed to a planting furrow formed by a furrow opener.

In another embodiment the nozzle assembly is provided with an agitator assembly having a transverse rod that is provided with a plurality of radially extending fingers. The transverse rod is rotated back and forth through one hundred and eighty degrees by a gearbox/motor assembly. The radially extending fingers sweep the gaps between the individual baffles.

BRIEF DESCRIPTION OF THE DRAWINGS

FIG. 1 is a side view of an agricultural planter using the subject product on demand delivery system.

FIG. 2 is a side cross sectional view of the nozzle assembly of the product on demand delivery system.

FIG. 3 is a side cross sectional view of the nozzle assembly of the product on demand delivery system having an air deflecting insert.

FIG. 4 is a side cross sectional view of the nozzle assembly of the product on demand delivery system having a product exposure limiting element.

FIG. 5 is a top perspective view of the air deflecting insert.

FIG. 6 is a bottom perspective view of the air deflecting insert.

FIG. 7 is a bottom perspective view of the product exposure limiting element.

FIG. 8 is a front cross sectional view of the nozzle assembly of the product on demand delivery system.

FIG. 9 is a front perspective and partial cross sectional view of the nozzle assembly of the product on demand delivery system.

FIG. 10 is a front perspective view of the nozzle assembly being provided with an agitator assembly.

FIG. 11 is a cross sectional view of the nozzle assembly being provided with an agitator assembly.

DETAILED DESCRIPTION

An agricultural seeding machine 10 comprises a frame 12 on which are mounted a plurality of individual planting units 14. The planting units 14 are coupled to the frame 12 by a parallelogram linkage 16 so that the individual planting units 14 can move up and down to a limited degree relative to the frame 12. Each of the individual planting units comprises an auxiliary seed hopper 18 for holding seed, a seed meter 20 for metering seed received from the auxiliary seed hopper 18 and a furrow opener 22 for forming a planting furrow in a field for receiving metered seed from the seed meter 20. The seed is transferred to the planting furrow from the seed meter by a seed tube 24. A closing assembly 26 is used to close the planting furrow with the seed contained therein. In the preferred embodiment the seed meter 20 is a vacuum seed meter, although other types of seed meters using mechanical assemblies or positive air pressure could also be used with the subject invention. It should be noted that the present invention could also be used to apply non-seed products to the field. For seed and non-seed products, the planting unit could be considered an application unit with an auxiliary hopper for holding product, a product meter for metering product received from the auxiliary hopper and an applicator for applying the metered product to a field. For example a dry chemical fertilizer or pesticide could be directed to the auxiliary hopper and metered by the product meter and applied to the field by the applicator.

The main frame 12 supports a main hopper 30 and an air pump 32. The air pump 32 is driven by a hydraulic motor, however other motor arrangements could be used, like electric motors for driving the air pump 32. The air pump 32 directs pressurized air to a manifold 34 through main air hose 36. The manifold 34 is formed from a hollow closed tubular support of the main frame 12. The manifold 34 is provided with a plurality of manifold outlets corresponding to the number of planting units 14 mounted to the frame 12. Individual air supply lines 38 extend from the manifold outlets and direct pressurized air from the manifold 34 to the upstream side of the nozzle assembly 39. The nozzle assembly 39 is located at the bottom of the main hopper 30. Product located in the main hopper 30 flows by gravity to the nozzle assembly 39. The upstream side of the nozzle assembly 39 is provided with a number of air inlets 41 corresponding to the number of air supply hoses 38. The air inlets 41 are spaced transversely along the upstream side of the nozzle assembly 39. The downstream side of the nozzle assembly 39 is provided with a number of product outlets 43 corresponding to the number of air supply hoses 38. The product outlets 43 are also spaced transversely along the downstream side of the nozzle assembly 39. The product outlets 43 lie opposite from the air inlets 41. Each air inlet 41 is aligned with a respective product outlet 43. Product supply hoses 42 extend from the product outlets 43 to the individual auxiliary hoppers 18 for directing product entrained in the air stream to the auxiliary hoppers 18.

The nozzle assembly 39 is provided with a concave bottom 44 having outwardly diverging sidewalls 46. Product in the form of seed or non-seed product is placed in the main hopper 30 through a lid 48. Portions of the nozzle assembly 39 can be opened to form a cleanout door 48. The cleanout door 48 is pivotally coupled to the nozzle assembly 39 by a hinge pin 50. The cleanout door 48 is held in place by latch 52 that contacts the interior sidewalls 46 of the main hopper 30. To open the cleanout door 48, the latch 52 is rotated ninety degrees so that the legs 54 of the latch 52 no longer contact the interior sidewalls 46. The cleanout door 48 is then pivoted about pin 50 so that it hangs downward from the pin 50. A resilient foam rubber gasket 56 is located between the cleanout door 48 and the exterior surface of the outwardly diverging sidewalls 46 for sealing the main hopper 30 when the cleanout door 48 is closed.

Each air inlet 41 and corresponding product outlet 43 are formed from two plastic parts. The two plastic parts are pinned together by integral pins formed on one of the parts and receiving apertures formed on the other. The air inlet 41 is angled downwardly relative to the concave bottom 44 and correspondingly the product outlet 43 is angled upwardly relative to the concave bottom 44. An integral baffle 58 extends between the air inlet 41 and the product outlet 43. The baffle 58 is peaked and is located above the air stream passing from the air inlet 41 to the product outlet 43. The downwardly angled air inlet 41 prevents product from backing up into the air supply hose 38, whereas the upwardly angled product outlet 43 prevents product from flowing into and clogging the product supply hose 42.

Adjacent air inlet 41 and product outlet 43 combinations are transversely spaced from one another so that seed or non-seed product can pass on either side of the baffles 58 and puddle beneath the baffles 58. An air stream passing from the air inlet 41 to the product outlet 43 picks up product located in the puddle and directs it through product supply hose 42 to the auxiliary hopper 18. The transfer of product from the main hopper 30 to the auxiliary hoppers 18 is done automatically as product is needed by the auxiliary hopper 18. As an individual auxiliary hopper 18 fills up with product, the auxiliary hopper product inlet 60 becomes covered by product blocking and slowing the air stream so that the air stream no longer picks up product in the main hopper 30 and transports the product to the auxiliary hopper 18. Conversely, as product is used up by the product meter 20, the auxiliary hopper product inlet 60 is uncovered and the air stream again picks up product for delivery to the auxiliary hopper 18. In this way the auxiliary hoppers 18 are always and automatically provided with product. The side walls of the auxiliary hoppers 18 are provided with screen vents 61 for venting air pressure in the auxiliary hoppers 18. The vent screens 61 can also be located in the lids of the auxiliary hoppers 18 as long as the vent screens 61 are above the respective product inlets.

In some situations product having large particles, like large seeds (corn and soybeans), are difficult for the air stream to pick up. To accommodate large seed, the air inlet 41 may be provided with an insert 62 having an air stream deflecting portion 64 that deflects a portion of the air stream downwardly to agitate the seed in the seed puddle and capture the seed in the air stream passing into the product outlet 43. The insert is provided with a locating tang 66 that engages a slot formed in the air inlet 41 to correctly orient the insert 62 and the air deflecting portion 64.

In other situations the seed or non-seed product may be too light and will be readily carried by even a small air stream. To overcome this problem the baffles 58 may be provided with an element 68. The element 68 can be clipped on to the baffles 58. The element has an obstructing bottom 70 that limits the amount of product exposed to the air stream. Element 68 is made of plastic and is provided with finger grips 72. By compressing the finger grips 72 the upper gap 74 is opened so that the clip can be clipped to the baffles 58.

Figure 10:
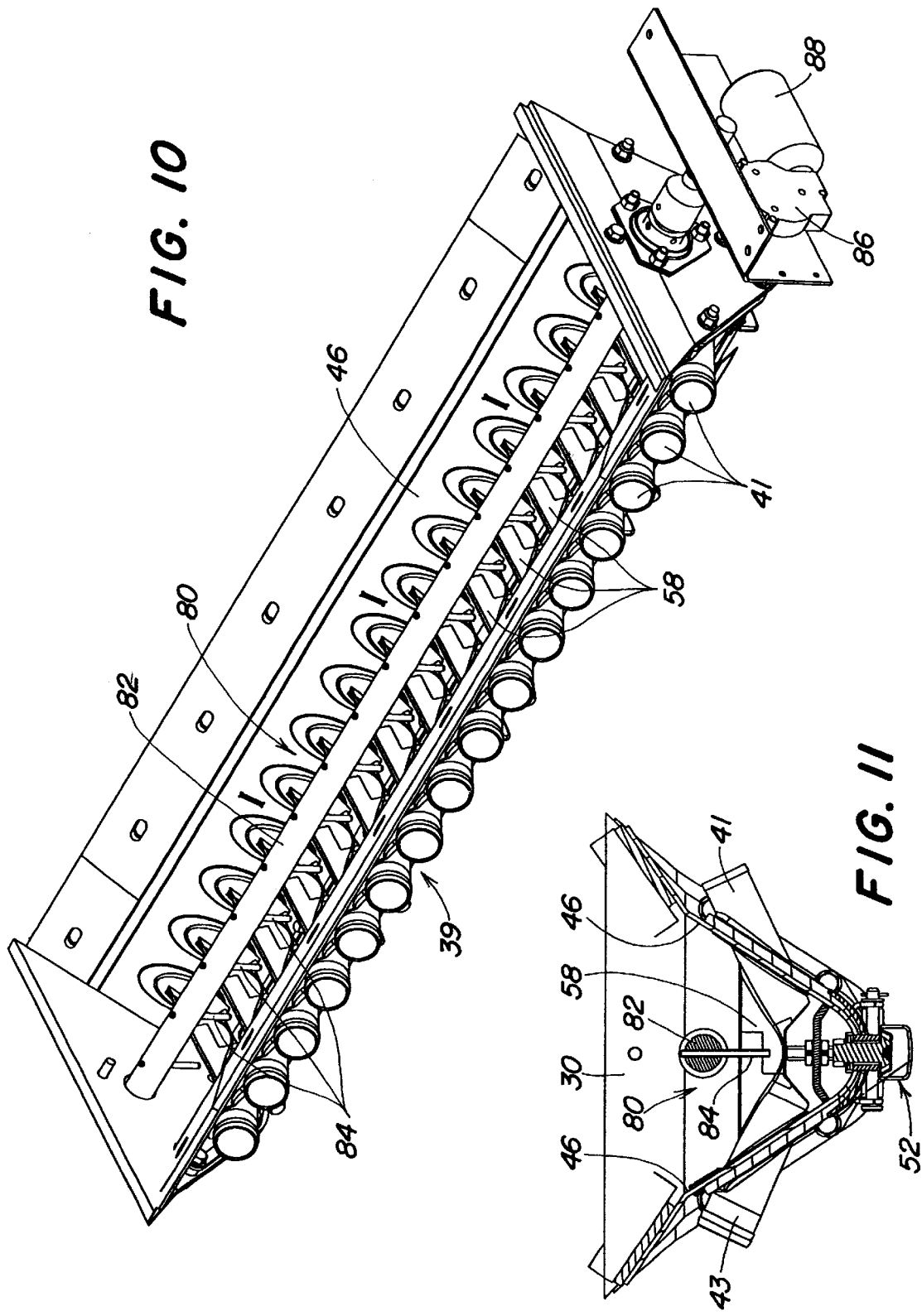

In an alternative embodiment the large seed insert 62 can be eliminated in favor of an agitator assembly 80. The agitator assembly 80 comprises a transverse rod 82 extending across the nozzle assembly 39. The transverse rod 82 is provided with a plurality of radially extending fingers 84. As shown, in FIG. 10 the fingers are transversely aligned with one another.

Figure 11:
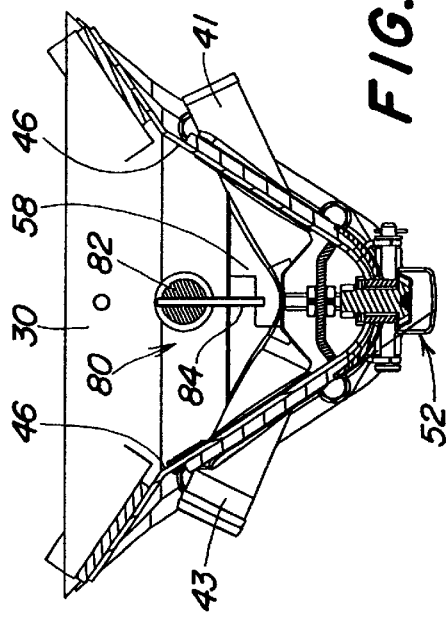

The transverse rod 82 is rotated back and forth by a gearbox 86 being driven by a motor 88. At the bottom dead center position of the fingers 84 they extend between the individual nozzles defined by the aligned air inlets 41 and the product outlets 43. In this way the fingers 84 sweep the area between the nozzles. The gear box/motor assembly 86/88 drive the transverse rod fifty-one and one-half degrees in each direction from the bottom dead center illustrated in FIG. 11. As such, the fingers 84 sweep an arc of one-hundred three degrees.

Having described the preferred embodiment, it will become apparent that various modifications can be made without departing from the scope of the invention as defined in the accompanying claims.

What is claimed is:

1. A product on demand delivery system for agricultural product, said system comprising:

a frame;

a main hopper mounted on the frame, the main hopper having a nozzle assembly into which product in the main hopper is directed, the nozzle assembly having an upstream sidewall, a downstream sidewall and a bottom;

a plurality of application units are mounted to the frame, each application unit is provided with a product meter and an applicator for applying the product to a field, each product meter is coupled to the nozzle assembly by a product supply hose, each product supply hose is provided with a product outlet that is coupled to the downstream sidewall of the nozzle assembly and a product inlet that is in communication with the respective product meter;

an air pump is pneumatically coupled to the upstream sidewall of the nozzle assembly by a plurality of air supply hoses, the air pump generates pressurized air that is directed into the air supply hoses, the number of air supply hoses correspond to the number of application units, each air supply hose has an air inlet that is coupled to the nozzle assembly opposite the product outlet of a product supply hose, so that product located in the nozzle assembly is taken up by the air stream as the air stream passes from the air inlet of the respective air supply hose through the nozzle assembly to the respective product outlet of the product supply hose, the product supply hose directing product to the respective product meter.

2. A product on demand delivery system as defined by claim 1 wherein each application unit is provided with an auxiliary hopper located between the product inlet and the product meter.

3. A product on demand delivery system as defined by claim 2 wherein the nozzle assembly is provided with a plurality of baffles corresponding to the number of application units, the baffles extend between and above the air inlets of the air supply hoses and the respective product outlets of the product hoses.

4. A product on demand delivery system as defined by claim 3 wherein each baffle has a peaked top and gaps are formed between adjacent baffles to allow product to fall to the bottom of the nozzle assembly.

5. A product on demand delivery system as defined by claim 3 wherein the product outlets of the product hoses are angled upwardly relative to the bottom of the nozzle assembly.

6. A product on demand delivery system as defined by claim 5 wherein the air inlets of the air supply hoses are angled downwardly relative to the bottom of the nozzle assembly.

7. A product on demand delivery system as defined by claim 6 wherein the bottom of the nozzle assembly is concave and the upstream and downstream sidewalls diverge outwardly from one another.

8. A product on demand delivery system as defined by claim 7 further comprising an air manifold which is pneumatically coupled to the air pump pneumatically upstream from the air supply hoses, each of the air supply hoses being pneumatically coupled to the manifold.

9. A product on demand delivery system as defined by claim 8 wherein the air manifold is formed by a hollow member of the frame supporting the main hopper.

10. A product on demand delivery system as defined by claim 8 wherein the nozzle assembly is provided with a cleanout door located below the air inlets of the air supply hoses and the product outlets of the product hoses.

11. A product on demand delivery system as defined by claim 10 wherein each application unit comprises a planting unit with the product meter comprising a seed meter and the applicator comprising a furrow opener.

12. A product on demand delivery system as defined by claim 11 wherein each of the seed meters is a vacuum seed meter.

13. A product on demand delivery system as defined by claim 3 wherein the air inlets of the air supply hoses are provided with inserts having an air stream deflecting portion that deflects a portion of the air stream downwardly towards the bottom of the nozzle assembly to agitate product located in the bottom of the nozzle assembly.

14. A product on demand delivery system as defined by claim 3 wherein the baffles are provided with an element having an obstructing bottom for reducing the amount of product exposed to the air stream passing between the air inlets of the air supply hoses and the product outlets of the product supply hoses.

15. A product on demand delivery system for agricultural product, said system comprising:

an implement frame that can be transported through a field;

a main seed hopper mounted on the frame, the main hopper having a nozzle assembly into which product in the main hopper is directed by gravity, the nozzle assembly having an upstream sidewall, a downstream sidewall and a bottom;

a plurality of planting units are mounted to the frame, each planting unit is provided with a seed meter for metering seed and a furrow opener for forming a planting furrow into which metered seed is deposited, each seed meter is coupled to the main seed hopper by a product supply hose, each product supply hose is provided with an product outlet that is coupled to the downstream sidewall of the nozzle assembly and a product inlet that is in communication with the respective seed meter;

an air pump is pneumatically coupled to the nozzle assembly by a plurality of air supply hoses, the air pump generates an air stream that is directed into the air supply hoses, the number of air supply hoses corresponds to the number of planting units, each air supply hose has an air inlet that is coupled to the upstream sidewall of the nozzle assembly opposite the product outlet of the product supply hose, so that the air stream passes from the air inlet of the air supply hose to the product outlet of the product supply hose through the nozzle assembly, so that seed located in the bottom of the nozzle assembly is taken up by the air stream and is directed through the product supply hose to the respective seed meter.

16. A product on demand delivery system as defined by claim 15 wherein each planting unit is provided with an auxiliary seed hopper located between the product inlet and the seed meter.

17. A product on demand delivery system as defined by claim 16 wherein the nozzle assembly is provided with a plurality of baffles corresponding to the number of application units, the baffles extend between and above the air inlets of the air supply hoses and the respective product outlets of the product hoses so that the air streams from the air supply hoses pass beneath the baffles.

18. A product on demand delivery system as defined by claim 17 wherein each baffle has a peaked top and gaps are formed between adjacent baffles to allow product to fall to the bottom of the nozzle assembly.

19. A product on demand delivery system as defined by claim 17 wherein the bottom of the nozzle assembly is concave with the upstream sidewall and the downstream sidewall diverge outwardly from one another, the air inlet is downwardly angled relative to the bottom of the nozzle assembly and the product outlet of the product hose is upwardly angled relative to the bottom of the nozzle assembly.

20. A product on demand delivery system as defined by claim 19 wherein the air inlets of the air supply hoses are provided with inserts having an air stream deflecting portion that deflects a portion of the air stream downwardly towards the bottom of the nozzle assembly to agitate product located in the bottom of the nozzle assembly.

21. A product on demand delivery system as defined by claim 19 wherein the baffles are provided with an element having an obstructing bottom for reducing the amount of product exposed to the air stream passing between the air inlets of the air supply hoses and the product outlets of the product supply hoses.

22. A product on demand delivery system as defined by claim 19 further comprising an air manifold which is pneumatically coupled to the air pump pneumatically upstream from the air supply hoses, each of the air supply hoses being pneumatically coupled to the manifold.

23. A product on demand delivery system as defined by claim 22 wherein the air manifold is formed by a hollow member of the frame supporting the main seed hopper.

24. A product on demand delivery system as defined by claim 23 wherein the bottom of the nozzle assembly is provided with a cleanout door located below the air inlets of the air supply hoses and the product outlets of the product hoses.

25. A product on demand delivery system as defined by claim 24 wherein each of the seed meters is a vacuum seed meter.

26. A product on demand delivery system as defined by claim 25 wherein each planting unit is coupled to the implement frame by a linkage that permits limited up and down movement of each planting unit relative to the implement frame.

27. A product on demand delivery system for agricultural product, said system comprising:

an implement frame that can be transported through a field;

a main seed hopper mounted on the frame, the main hopper having a nozzle assembly with a concave bottom and an upstream sidewall and a downstream sidewall, the upstream sidewall and the downstream sidewall are outwardly diverging from one another, product in the main hopper is directed to the bottom of the nozzle assembly by gravity;

a plurality of planting units are mounted to the frame, each planting unit is provided with a seed meter and a furrow opener for forming a planting furrow into which metered seed is deposited, each seed meter is coupled to the main seed hopper by a product supply hose, each product supply hose is provided with a product outlet that is coupled to the downstream sidewall of the nozzle assembly and a product inlet that is in communication with the respective seed meter, the product outlet of the product hose is upwardly angled relative to the bottom of the nozzle assembly;

an air pump is pneumatically coupled to the nozzle assembly by a plurality of air supply hoses, the air pump generates an air stream that is directed into the air supply hoses, the number of air supply hoses corresponding to the number of application units, each air supply hose has an air inlet that is coupled to the upstream sidewall of the nozzle assembly opposite the product outlet of the product supply hose, so that the air stream passes from the air inlet of the air supply hose to the product outlet of the product supply hose through the nozzle assembly, so that seed located in the bottom of the nozzle assembly is taken up by the air stream and is directed through the product supply hose to the auxiliary seed hopper.

28. A product on demand delivery system as defined by claim 27 wherein each planting unit is provided with an auxiliary seed hopper located between the product inlet and the seed meter.

29. A product on demand delivery system as defined by claim 28 wherein the nozzle assembly is provided with a plurality of baffles corresponding to the number of application units, the baffles extend between and above the air inlets of the air supply hoses and the respective product outlets of the product hoses so that the air streams from the air supply hoses pass beneath the baffles.

30. A product on demand delivery system as defined by claim 29 wherein each baffle has a peaked top and gaps are formed between adjacent baffles to allow product to fall to the bottom of the nozzle assembly.

31. A product on demand delivery system as defined by claim 30 wherein the air inlets of the air supply hoses are provided with inserts having an air stream deflecting portion that deflects a portion of the air stream downwardly towards the bottom of the nozzle assembly.

32. A product on demand delivery system as defined by claim 30 wherein the baffles are provided with a clip on element having an obstructing bottom for reducing the amount of product exposed to the air stream passing between the air inlets of the air supply hoses and the product outlets of the product supply hoses.

33. A product on demand delivery system as defined by claim 30 wherein the air inlet is downwardly angled relative to the upstream sidewall and the product outlet is upwardly angled relative to the downstream sidewall.

* * * * *